United States Patent [19]

Blanks

[11] Patent Number: 5,524,343

[45] Date of Patent: Jun. 11, 1996

[54] PRESS-FIT GLUELESS BEARING PIVOT ASSEMBLY

[75] Inventor: John B. Blanks, Edmond, Okla.

[73] Assignee: Seagate Technology, Inc., Scotts Valley, Calif.

[21] Appl. No.: 210,687

[22] Filed: Mar. 18, 1994

[51] Int. Cl.⁶ .................. B23P 15/00; B21D 53/00
[52] U.S. Cl. ................... 29/898.09; 29/407.05; 29/434; 29/446
[58] Field of Search ............... 29/898.09, 407, 29/434, 446, 525.1

[56] References Cited

U.S. PATENT DOCUMENTS

| | | | |
|---|---|---|---|
| 3,447,239 | 6/1969 | Slick | 29/898.09 |
| 4,984,115 | 1/1991 | Takahashi et al. | 360/106 |
| 5,132,944 | 7/1992 | Berg | 369/13 |
| 5,144,743 | 9/1992 | Kempas | 29/898.09 |
| 5,272,889 | 12/1993 | Harris | 62/429 |
| 5,301,078 | 4/1994 | Makino et al. | 360/106 |
| 5,341,569 | 8/1994 | Takamizawa et al. | 29/898.09 |
| 5,373,407 | 12/1994 | Stupak, Jr. et al. | 360/99.08 |
| 5,421,088 | 6/1995 | Kawamura | 29/898.09 |

*Primary Examiner*—Larry I. Schwartz
*Assistant Examiner*—Marc W. Butler
*Attorney, Agent, or Firm*—Kinney & Lange

[57] ABSTRACT

A pivot assembly for an actuator arm of a disk drive is disclosed. The housing of the actuator arm is supported on a shaft by two or more bearings. An assembly load is applied to the housing relative to the shaft such that the assembly load is carried by only one of the bearings. The axial location of the housing relative to the shaft with the assembly load applied is observed as a reference location. The assembly load is removed. One of the races of a bearing is moved until the housing returns to the reference location. In this state the bearings have a preload which is equal to the assembly load. The preload can be achieved with none of the races being loose-fit, and there is no need for adhesive.

15 Claims, 6 Drawing Sheets

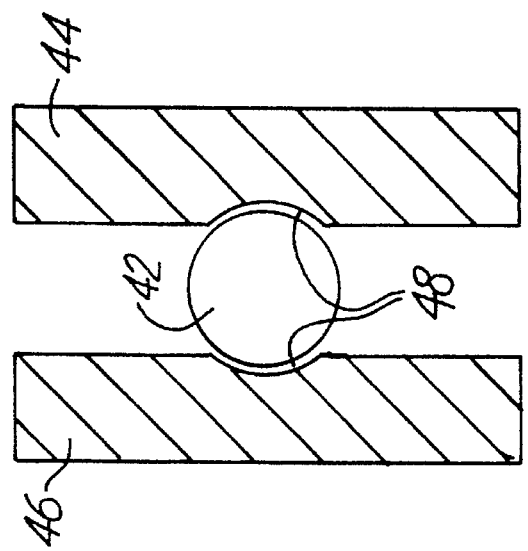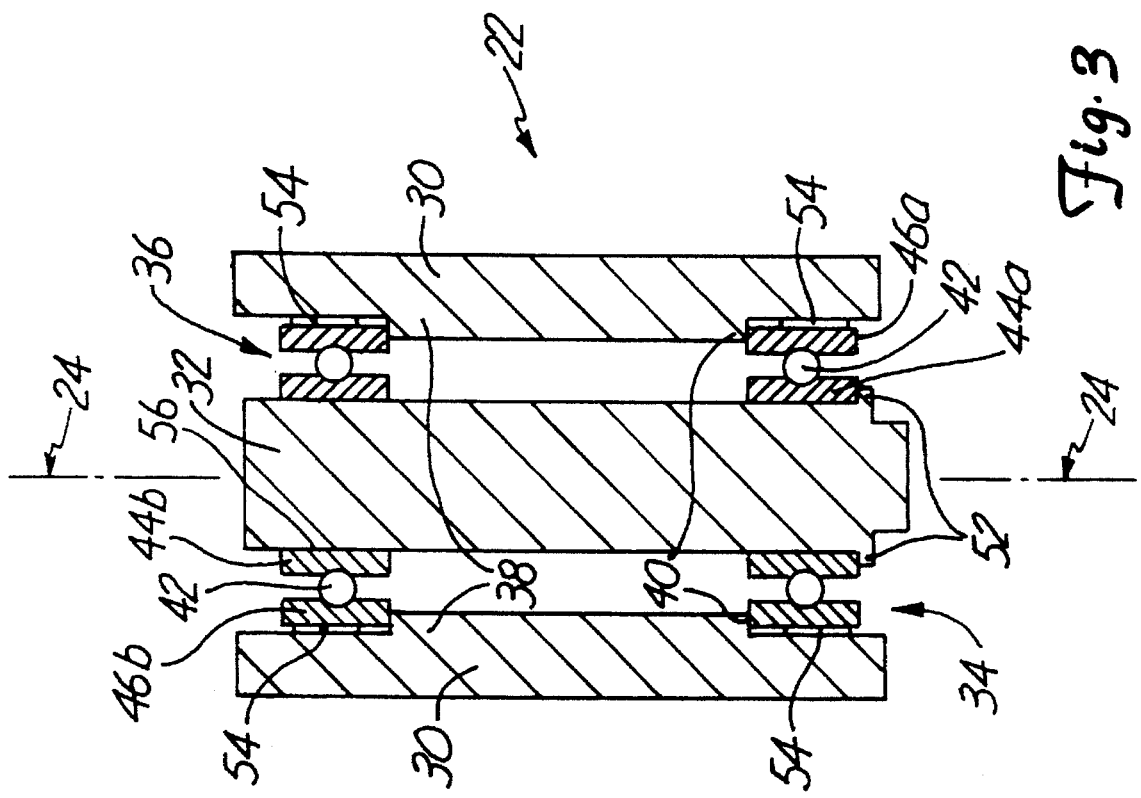

PRESS-FIT GLUELESS BEARING PIVOT ASSEMBLY

BACKGROUND OF THE INVENTION

This invention relates to computer disc drive actuator assemblies, and more particularly to the bearings used to support an actuator arm housing in such an assembly.

The computer industry traditionally records information on disc drives. The disc drive normally includes one or more discs which are rotated, with information magnetically recorded on the surface of the disc along tracks. Information is read by a magnetic transducer or head which is supported on a flex arm or gimble assembly of an actuator arm. Pivoting of the actuator arm is used to move the transducer radially between tracks along the disc surface. It is essential that the positioning of the transducer at a particular track be accomplished both accurately and reproducibly, to ensure that the proper information is read by the transducer.

There has been an ever increasing desire to minimize the space required by computer components and to maximize the speed with which computers can perform their various functions. To meet these desires, disc drive designers have sought to decrease the distance between tracks on a disc, and to decrease the time required to accurately and reproducibly position the transducer. Accordingly, the accuracy of the actuator arm is required to be greater and greater.

Actuator arms are generally supported by a system of ball bearings around a shaft, such that the actuator arm rotates about the shaft. Typically two axially-spaced conventional roller bearings are used to support the housing of the actuator arm about the shaft. The first step in the typical assembly of the actuator arm housing onto the shaft is to attach the inner race of a roller bearing against a shoulder on the shaft. Second, the housing is attached around the roller bearing such that the outer race butts up against a shoulder on the housing. The axial relationship between the shaft and the actuator arm housing is thus set through attachment of this first roller bearing. Thirdly, a second bearing unit is placed around the shaft and between the shaft and the housing.

Commercially available roller bearings often have a small amount of looseness or "free play" both in the axial and radial direction. That is, the inner race can be displaced with respect to the outer race merely by changing the direction of axial and radial force transmitted by the bearing. However, bearing free play can be extremely detrimental to the performance of the disc drive. In particular, radial free play of the pivot assembly can allow the transducer to be moved to the wrong location on the disc, such that information is distorted, read improperly or, worse yet, the wrong information is read.

In additional to the radial accuracy of the pivot assembly, the radial stiffness of the pivot assembly must be taken into account. The pivot assembly must have proper stiffness such that the starting, moving and stopping of the transducer can be done quickly and without significant vibration of the transducer. Similar to the free play problem, vibration can cause distortion or improper reading of information even if the transducer is in the proper location. The pivot assembly/ actuator arm must be stiff enough so that any residual vibration is small in magnitude, and must further not create any critical frequencies or resonances within the band width of the servo system.

Various methods have been used to try to improve the radial performance of the bearing mechanism in actuator arm pivot assemblies. Perhaps the simplest method is to require a higher degree of accuracy in the design and construction of the bearing mechanism, such that the resulting bearing mechanism has a smaller amount of free play. However, increasing the bearing mechanism precision to a sufficient level can be quite costly, and other methods have been attempted to improve the performance of the bearing.

Another method to improve the radial performance of a bearing mechanism is to "take up" (i.e., reduce or eliminate) the free play by applying a "preload" force in the axial or radial direction. The preload force is intended to prevent a change in the direction of the force transmitted by the bearing, such that the inner race maintains a constant displacement from the outer race. Accordingly, the preload force should normally be greater than the forces transmitted by the bearing during use.

In the case of spherical ball bearings, much of the free play is caused by the smaller diameter of the balls moving within the larger diameter curvature of the raceways. Applying an axial preload will cause the balls to centralize themselves in a particular portion of the raceways of the bearings, and eliminate both axial and radial free play. The preload will also cause some compression of the balls and raceways affecting the stiffness of the pivot assembly. If two bearing units are used, generally one bearing unit will be preloaded in one direction and the second bearing unit preloaded in the other direction, such that the preload forces transmitted by the bearings offset each other with no resultant force on the pivot assembly. With a proper axial preload present, the pivot assembly can be used without the balls of either bearing leaving the particular portion of the raceways, and axial and radial free play is eliminated. However, to eliminate free play while still obtaining the desired stiffness and endurance characteristics of the bearings, it is essential that the preload force be accurately set and maintained.

In configuring a pivot assembly for axial preloading of one bearing against another, placement of three of the races is not critical. The first three races may be attached by any method against the outside of the shaft or the inside of the housing. It is the force placed on the fourth and final bearing race which determines the preloaded of the bearings against each other. Accordingly, preloading is generally accomplished by placing a defined axial force on the fourth race after the other three races have been axially positioned.

One known method for placing an accurate preload force on the bearings is to allow the fourth race to be loose-fit, either against the shaft or the housing. The placement of the first three races is set such that these races can withstand a significant amount of axial force without moving. A preload spring is then placed against the fourth race to provide the desired axial preload. The spring places a known and controlled axially directed force on the fourth race. Because the fourth race is loose-fit, the shaft or housing places no force on the fourth race, and the entire preload is carried through the bearing mechanism. When the preload is transmitted through the bearing and no other forces are present, an equal and opposite axial preload must carried between the housing and the shaft through the second bearing element. Thus both bearing elements are preloaded with the identical force applied by the spring. The spring must be adequately placed so that it will continue to provide the preload force against the fourth race throughout the life of the pivot assembly.

However, the loose-fit of the fourth race causes its own problems in the radial accuracy of the bearing mechanism. The loose-fit fourth race is essentially in a bi-stable state (i.e., it is either leaning in one direction or the other), and any force which causes the fourth race to wobble between states will cause radial inaccuracy in the actuator arm and transducer.

The problem of the loose-fit fourth race has been addressed by applying lock-tight adhesive between the fourth race and the shaft or housing to which the fourth race is attached. The assembly of a pivot assembly which uses adhesive is largely the same as the loose-fit assembly described above. However, after the preload spring force is applied to the fourth race, the engagement between the fourth race and the shaft is cemented by adhesive. Because the set adhesive will carry the proper preload force, the spring for a glued fourth race may be removed after the adhesive sets up. Alternatively, a dead weight may be used to place the proper preload on the fourth race as the adhesive sets, and the dead weight may likewise be subsequently removed.

Using a glued fourth race eliminates the bi-stable tendency of the loose-fit fourth race described above, but also creates its own problems. Pivot assemblies are generally assembled in clean rooms, and the introduction of the adhesive to the clean room tends to be messy and difficult. It is difficult to control the application of the adhesive, both to ensure that adhesive fully extends on the necessary surfaces, as well as to ensure that no additional adhesive is applied which could seep out to contaminate the clean room conditions. Adhesive application problems become particularly egregious if the adhesive should enter the bearing structure and prohibit the bearing from working properly. Additionally, the long term stability of the adhesive is not always acceptable. If the adhesive deteriorates, the fourth race might again become loose, destroying the accuracy of the pivot assembly.

Accordingly, it is desired to find a method of placing the proper preload onto the bearings of the pivot assembly which will not lead to the problems discussed. It has generally been believed that the fourth race cannot be press-fit or otherwise rigidly attached, as there was no way to ensure placement of the proper axial preload force onto such a rigid attachment.

SUMMARY OF THE INVENTION

The invention is a method to properly and accurately preload bearings used in a pivot assembly for a disc drive actuator arm. The method avoids a loose-fitting fourth race and its problems, and avoids adhesives and their problems. The method involves press-fitting the fourth race to a location within free play of its bearing. An external assembly load equivalent to the desired preload is then applied via spring, dead weight or other method to the shaft relative to the housing, such that the external assembly load is carried by solely the other bearing (with the fourth race bearing remaining in free play). At this point the axial location of the housing relative to the shaft is recorded as a reference location. The external assembly load is removed, and the fourth race is axially moved until the housing returns to the reference location. The fourth race remains in this final location carrying the preload force due to the friction of the press-fit. Through the method of this invention, the preload carried by both bearings is identical to the external assembly load previously applied before final positioning of the fourth race.

BRIEF DESCRIPTION OF THE DRAWINGS

FIG. 3 is a cross-sectional view of the pivot assembly, taken along line A—A of FIG. 2.

FIG. 4 is an enlarged cross-sectional view of a bearing of the pivot assembly in the axial play condition.

DETAILED DESCRIPTION OF THE PREFERRED EMBODIMENTS

Figure 1:
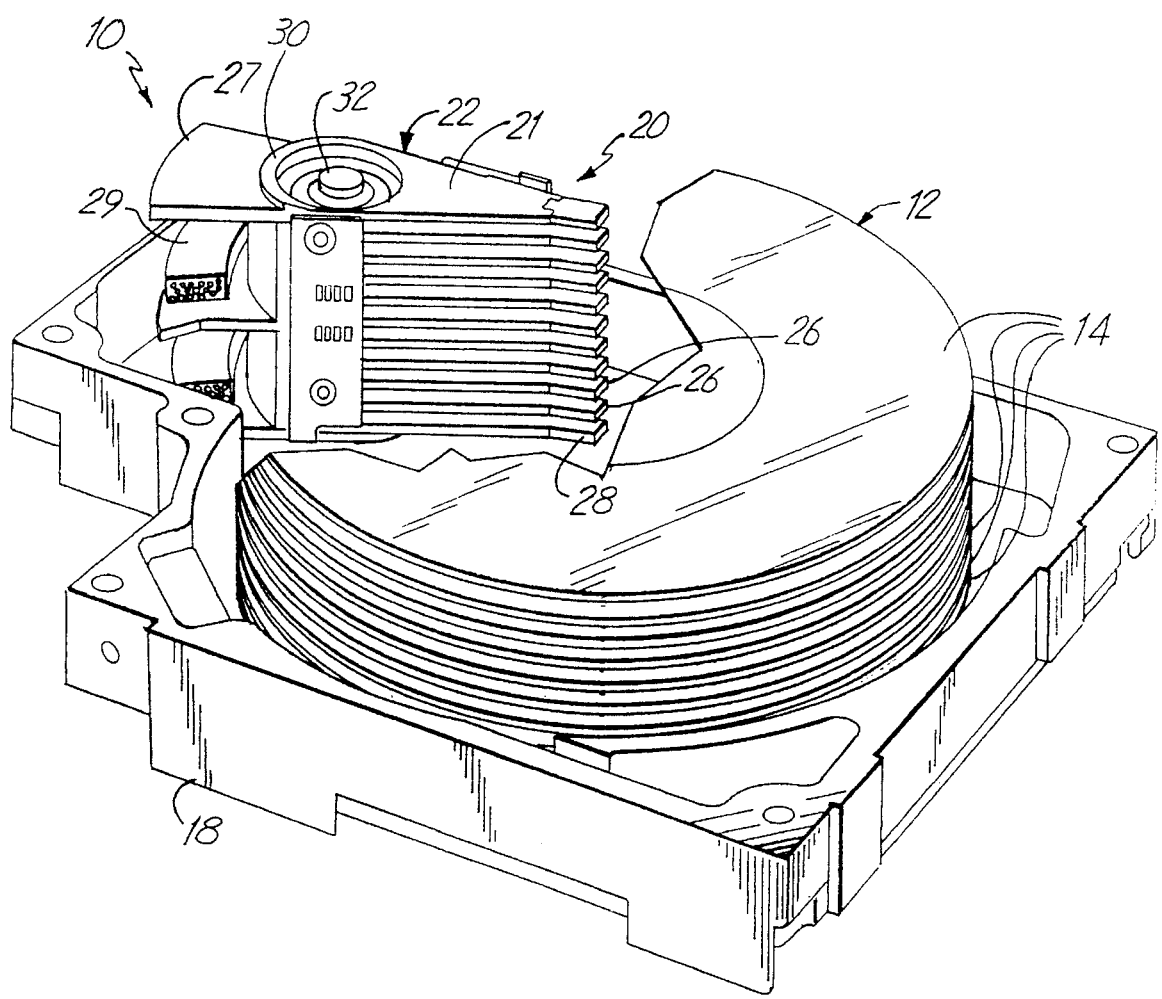
FIG. 1 is a cut-away perspective view of a disc drive with the pivot assembly of the present invention.
Figure 2:
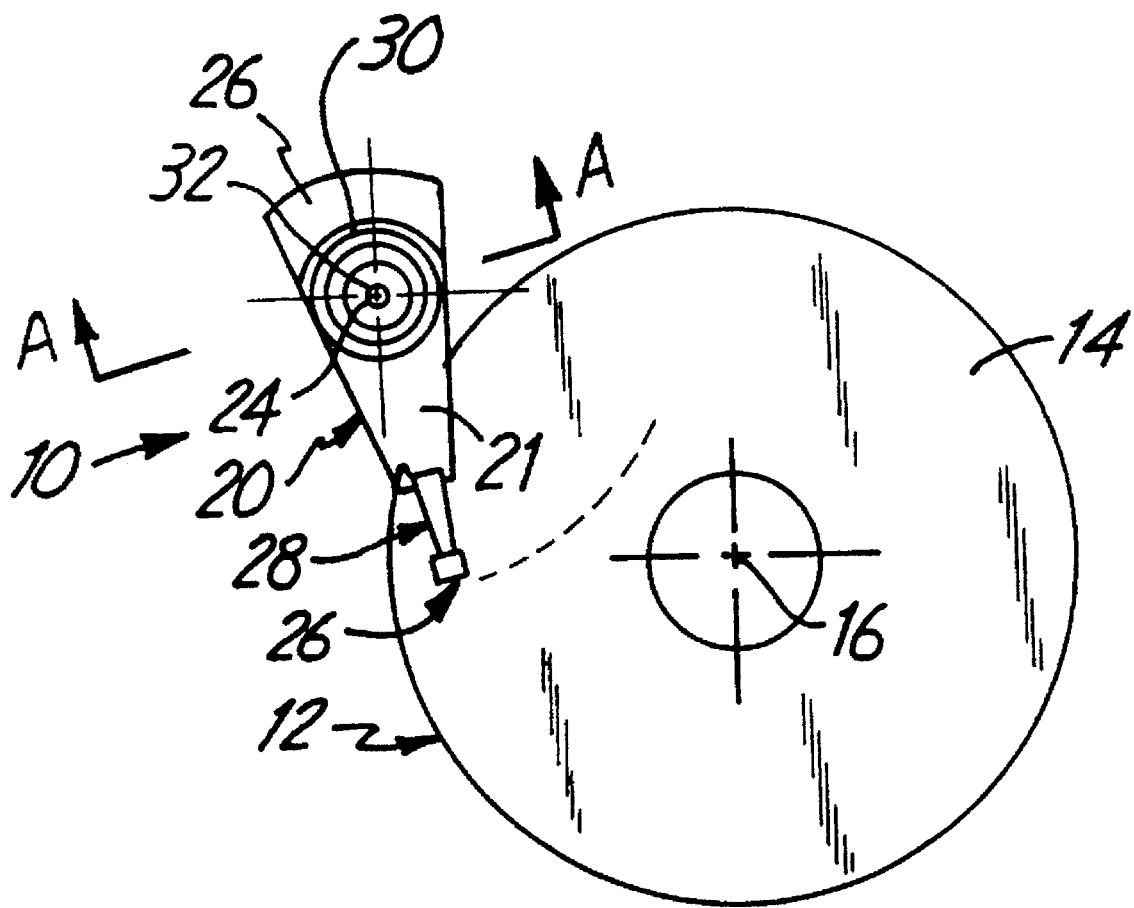
FIG. 2 is a top plan view of a disc drive with the pivot assembly of the present invention.

FIGS. 1 and 2 show disc drive 10 of a computer device. A hard disc stack 12 has one or more disc(s) 14 which rotate about axis 16. As shown in FIG. 1, the disc drive 10 may be packaged in a casing 18. The casing 18 serves to protect the disc drive 10 as well as to support and anchor the disc drive 10 when placed in a computer. The disc(s) 14 carry a series of generally concentric tracks upon which information is magnetically written and read.

An E-block 20 carrying a number of actuator arms 21 is shown with a pivot assembly 22 which allows the E-block 20 to pivot about axis 24. One end of each actuator arm 21 carries a transducer 26 or magnetic head mounted on flex arm 28. As can be seen, pivoting of the actuator arm 21 about axis 24 will cause the transducer 26 to be transported from track to track along the surface of disc 14. The E-block 20 is pivoted by way of a controlled motor (not shown) such as a stepper motor or voice coil motor. In the particular embodiment shown in FIG. 1, the E-block 20 has an extended rear portion 27 which carries a magnetic coil section 29 which operates with a controlled magnetic field for proper movement of the E-block 20. Workers skilled in the art will recognize that any mechanism for pivoting the actuator arm 21 is acceptable so long as it can be controlled to stop the actuator arm 21 such that the transducer 26 is located on a particular track.

The speed with which the transducer 26 can be placed on a particular track significantly constrains the time necessary to perform a read or write function of the disc drive 10. Additionally, the accuracy with which the transducer 26 can be placed at a particular location constrains the density of tracks which can be permitted in a given size disc 14. The speed and accuracy of transducer placement is significantly affected by the pivot assembly 22 of the actuator arm 21.

As shown in FIG. 3, the pivot assembly 22 includes a housing section 30 of the E-block 20 mounted on a shaft 32. The shaft may be made of 300 or 400 series stainless steel. The shaft 32 remains stationary and is supported relative to the casing 18 which similarly supports the disc stack 12. The housing 30 is supported on shaft 32 by rolling element bearings 34, 36. In the preferred embodiment, the rolling element bearings 34, 36 have a nominal inner radius of ¼ inch, and a nominal outer radius of ½ inch. The housing 30 may be constructed of aluminum or magnesium, for instance, and may be counterbored at the top and bottom to nominally ½ inch. The counterboring of the housing 30 provides an upper shoulder 38 and a lower shoulder 40 to support the bearings 34, 36.

While the roller elements may be cylindrical rollers, tapered rollers, needles, etc., it is preferred that the roller elements be spherical balls. Spherical ball bearing units suitable for this use are commonly commercially available. The bearings 34, 36 include a number of spherical balls 42 situated between inner races 44a, 44b and outer races 46a, 46b. The outer races 46a, 46b are attached to and moved with the housing 30 of E-block 20, while the inner races 44a, 44b are attached to the shaft 32. The inner and outer races 44a, 44b, 46a, 46b of the bearings 34 and 36 may be made of 440 stainless steel, as may the spherical balls 42.

The inner races 44a, 44b and the outer races 46a, 46b define toroidal raceways 48a, 48b for the balls 42 to travel. The curvature of the raceways 48a, 48b and contact surface of the balls 42 permits the transmission of both axial and radial forces through the bearing 34, 36. The balls 42 are free to rotate and move along the raceways 48a, 48b. Thus the outer races 46a, 46b (and housing 30) can rotate with respect to the inner races 44a, 44b (and shaft 32) in a relatively friction-free manner. The friction between the inner races 44a, 44b and the outer races 46a, 46b may further be lessened by use of a lubricant in conjunction with the balls 42. If a lubricant is used, the bearings 34, 36 may further include a shield, seal or other mechanism (not shown) to constrain the lubricant within the raceways 48a, 48b.

As shown in FIG. 4 of the bearing is in its "free play" condition, the curvature of raceways 48 is slightly greater than the curvature of the spherical balls 42. Due to this difference in curvature, the balls 42 can be slightly displaced both in the axial and radial directions. This slight displacement allows inner race 44 to have an amount of "free play" with respect to outer race 46. That is, inner race 44 can be displaced with respect to outer race 46 merely by changing the direction of axial and radial force transmitted by the bearing. While the bearing is in its "free play" condition shown in FIG. 4, the spherical balls do not simultaneously contact both an upper side and a lower side of the raceway 48, and no force is transmitted by the bearing. The bearings used in the preferred embodiment nominally allow 0.004 to 0.006 inches of axial play. The nominal radial free play corresponding to this in the bearings 34, 36 of the preferred embodiment is 0.0008–0.0011 inches. Bearings of this type are available from NMB Corporation.

The disc drive 10 will often be supported such that the disc stack 12 is horizontal and the shaft 32 of the pivot assembly 22 is vertical, and discussion of the assembly of the preferred embodiment disclosed herein will be described with reference to this directional configuration. However, it will be appreciated that the entire disc drive 10 may be placed sideways, upside down, or in other directional configurations, and must still be functional in these other directional configurations. Accordingly, the invention described herein is expressly not limited in any way to the particular directional orientation of the disc drive used.

Figure 6:
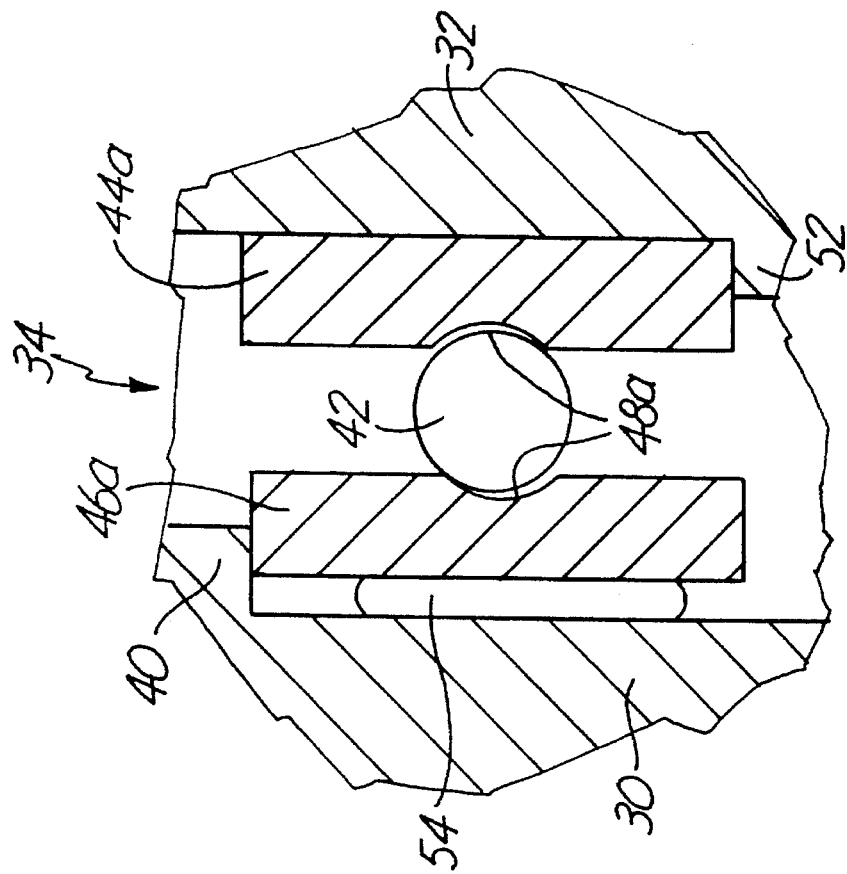
FIG. 6 is an enlarged cross-sectional view taken from FIG. 3 of the left side of the lower bearing of the pivot assembly, with the axial play taken up.
Figure 5:
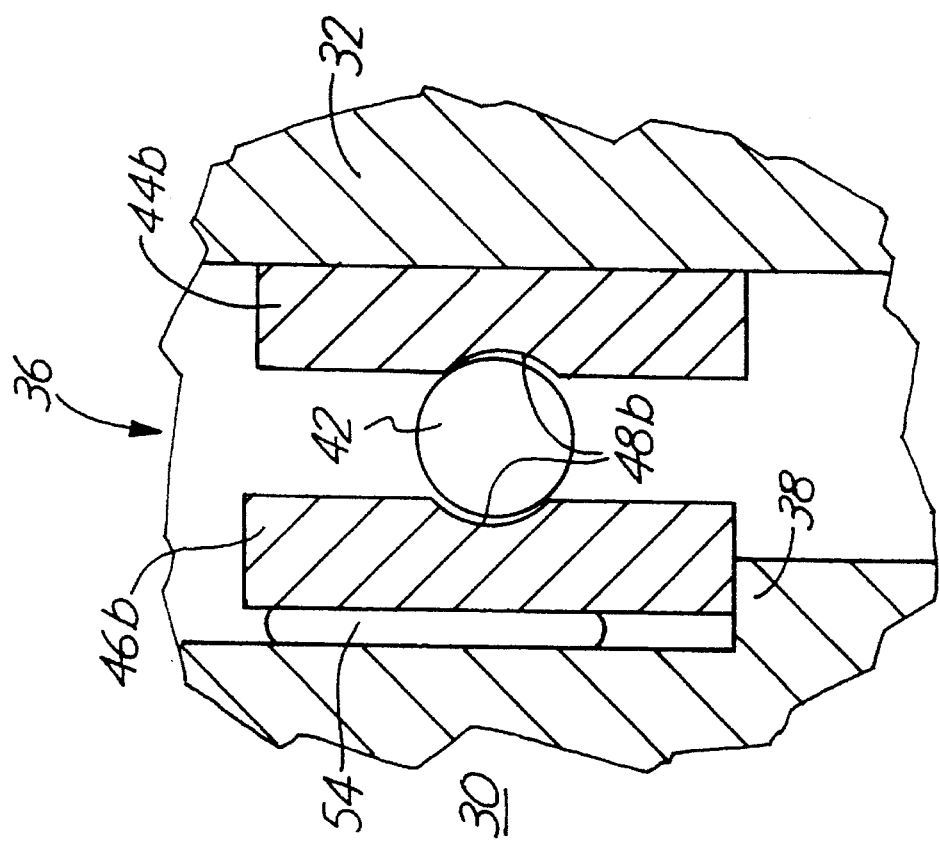
FIG. 5 is an enlarged cross-sectional view taken from FIG. 3 of the left side of the upper bearing of the pivot assembly, with the axial play taken up.

FIG. 5 shows the left side of the upper bearing 36 of the pivot assembly 22 with the axial play taken up, as will happen under preload. The inner race 44b is slightly axially displaced with respect to outer race 46b. The balls 42 ride on the lower, outer side and the upper, inner side of raceway 48b. In this configuration, the upper bearing 36 transmits an axial force upward on the shaft 32 and downward on the housing 30. FIG. 6 shows the left side of the lower bearing 34 of the pivot assembly 22 with the axial play taken up, as will happen under preload. The inner race 44a is slightly axially displaced with respect to outer race 46a, but this axial displacement is opposite of the axial displacement of upper bearing 36. The balls 42 ride on the upper, outer side and the lower, inner side of the raceway 48a. In this configuration, the bearing transmits an axial force downward on the shaft 32 and upward on the housing 30.

The pivot assembly 22 may be assembled as follows. First the shaft 32 is secured in a fixture 50 (shown schematically in FIGS. 7 and 8). Then the lower bearing 34 is pressed down around the shaft 32 until the inner race 44a butts up against a lower shoulder 52 of the shaft 32. The axial position of the inner race 44a of the lower bearing 34 is therefore now fixed in relation to the shaft 32. The attachment may be achieved by press-fitting, such that the inner diameter of the lower inner race 44a is slightly (about 0.002–0.004 inches) smaller than the outer diameter of the shaft 32. With a press-fit, the interference between these two surfaces restricts upward movement of the lower inner race 44a with respect to the shaft 32. Alternatively, the inner diameter of the lower inner race 44a may be slightly larger or nominally the same size as the outer diameter of the shaft, and may be secured by other means, including adhesives, screw fasteners, flange attachment and other means common in the art. As can be seen, the lower shoulder 52 of the shaft 32 prevents the lower bearing 34 from moving further downward. The lower inner race 44a may not even be axially secured at all, as the preload force, pressing the lower inner race 44a downward against the lower shoulder 52 of the shaft 32, may sufficiently attach the lower inner race 44a to the shaft 32.

After the lower inner race 44a is attached to the shaft 32, the housing 30 of the E-block 20 is pressed onto the outer race 46a of the lower bearing 34. Again, the lower housing shoulder 40 will axially position the housing 30 relative to the lower bearing 34 (and hence relative to the shaft 32). It will be recognized that the orientation of the shoulders 40, 52 on the upper side of outer race 46a and the lower side of inner race 44a will allow the transmission of significant axial force between the shaft 32 and the housing 30 without risking any axial dislocation. When the preload is applied, it should be directed such that the direction of force carried by the bearing follows the orientation of the shoulders 40, 52. The outer race 46a of the lower bearing 34 may be secured to the housing 30 by any conventional means, including those discussed above. However, it is preferred that a tolerance ring 54 be placed into the interface such that there will be no axial or radial movement of the lower outer race 46a with respect to the housing 30.

After the housing 30 is in place and positioned axially with respect to shaft 32, the upper bearing 36 may be added to the pivot assembly 22. As the bearings 34, 36 are generally pre-assembled, the inner race 44b must be placed onto the shaft 32 simultaneously with placement of the outer race 46b into the housing 30. The upper outer race 46b may be attached to the housing 30 by any conventional means, such that it is properly axially positioned. Similar to the lower outer race 46a, it is preferred that a tolerance ring 54 be placed into the interface such that there will be no axial or radial movement of the upper outer race 46a with respect to the housing 30. As shown, the upper bearing 36 may be axially positioned by butting up the outer race 46b of the upper bearing 36 against the upper shoulder 38 of the housing 30. This will allow ready transmission of axial force between the housing 30 and the upper outer race 46b without the risk of axial dislocation.

As discussed above, the axial positions where the first three races are attached to the shaft 32 and the housing 30 are not critical. Placement of the first race sets the axial relationship between the shaft and the lower bearing, placement of the second race sets the axial relationship between the lower bearing and the housing 30, and placement of the third race sets the axial relationship between the housing 30 and the upper bearing. It is not until the fourth race is axially positioned that a preload on the bearings is established. Workers skilled in the art will appreciate that it is unimportant whether the fourth race is an inner or outer race, or an upper or lower race, and that the invention can be equally practiced in all these configurations.

The shaft 32 has a smooth diameter section 56 to which the upper inner race 44b is positioned. Because there is no shoulder for the upper inner race 44b, it may be raised and lowered throughout the smooth diameter section 56 on the shaft 32. Also, because of the lack of a fourth shoulder, all axial load must be carried by the attachment between the upper inner race 44b and the shaft 32. In the preferred structure shown, the inner diameter of the upper inner race 44b is nominally 0.002–0.004 inches smaller than the diameter of the smooth diameter section 56, and the upper inner race 44b is press-fit on the shaft 32.

When the upper inner race 44b is placed directly opposite the upper outer race 46b, no axial load is being carried by the bearings 34, 36, and both bearings 34, 36 will be configured as shown in FIG. 4. The 0.004–0.006 inch axial play of both bearings 34, 36 remains the axial play of the housing 30 with respect to the shaft 32. In this state, the radial play of the shaft 32 with respect to the housing 30, will similarly remain the radial play of the unloaded bearing, or 0.0008–0.0011 inches in the preferred bearings described above.

At this point, the upper inner race 44b must be moved along the shaft 32 such that it is slightly lower than the upper outer race 46b. The upper inner race 44a is pre-positioned or offset 0.001–0.005 inches (preferably 0.002 inches) lower than the upper outer race 46b, after which the upper bearing 36 will be configured as shown in FIG. 5. In this pre-positioned state, the axial play of the housing 30 with respect to the shaft 32 becomes only 0.002–0.004 inches. This pre-positioning is necessary so that the assembly load (when applied) will be carried entirely by the lower bearing 34, while the upper bearing 36 remains in an axial play condition.

Figure 7:
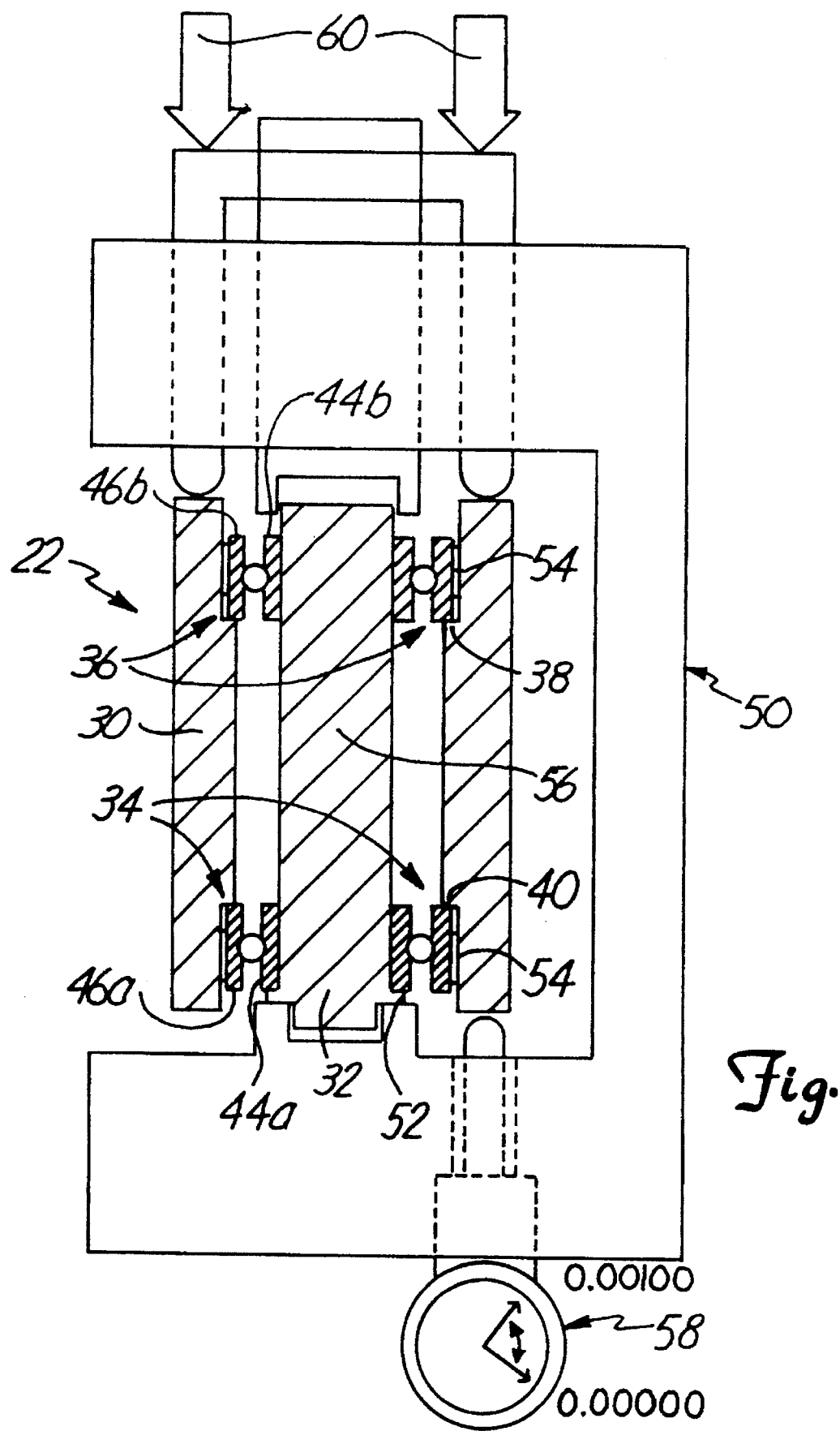
FIG. 7 is a cross-sectional view of the pivot assembly, taken along line A—A of FIG. 2, shown in a schematic fixture during application of the assembly load.

As shown in FIG. 7, an assembly load 60 is then applied to the housing 30 relative to the shaft 32. The assembly load 60 should be chosen to be identical to the desired preload of the bearings, and can be applied with a spring, dead weight, or other mechanism. The assembly/preload should be chosen to eliminate the axial and radial play in the bearings as well as increase the radial stiffness of the pivot assembly. The proper assembly/preload will cause some compression of the balls 42 and adjacent raceways 48a, 48b, and will cause a slight increase in the surface area of the contact between the balls 42 and the raceways 48a, 48b. For the preferred bearings discussed herein, the preferred assembly load 60 is typically from 3–5 pounds. Over and above taking the bearings 34, 36 out of their free play condition, axial compression of the bearings 34, 36 with a 5 pound load is theoretically about 0.0005 inches. This number is a function of radial play, raceway curvatures, bearing size, and load applied, and assumes ideal parts, no misalignment, no ball size or raceway variations, etc. In reality the compression of the bearings 34, 36 due to the assembly/preload has been greater than 0.0005 inches.

The assembly load 60 causes the housing 30 to move down with respect to the shaft 32 with the compression of the lower bearing 34. With the assembly load 60 applied, the upper bearing 36 remains within its state of free play (depicted in FIG. 4). In this condition, the entire assembly load 60 is carried by the lower bearing 34. The lower bearing 34 will now be configured as shown in FIG. 6. With the assembly load 60 applied, the axial positioning of the housing 30 is closely measured with respect to the shaft 32 by an indicator 58 (shown schematically). Since the lower bearing 34 is now carrying the desired preload and no other forces, the housing 30 is in its desired final location with respect to the shaft 32. The indicator 58 may be zeroed out at this location. The indicator 58 measures the axial position of the housing 30 relative to the shaft 32 in increments of 0.001 or less, and preferably in 0.0001 inch increments. In future applications it may be necessary to measure this position even more closely.

Figure 8:
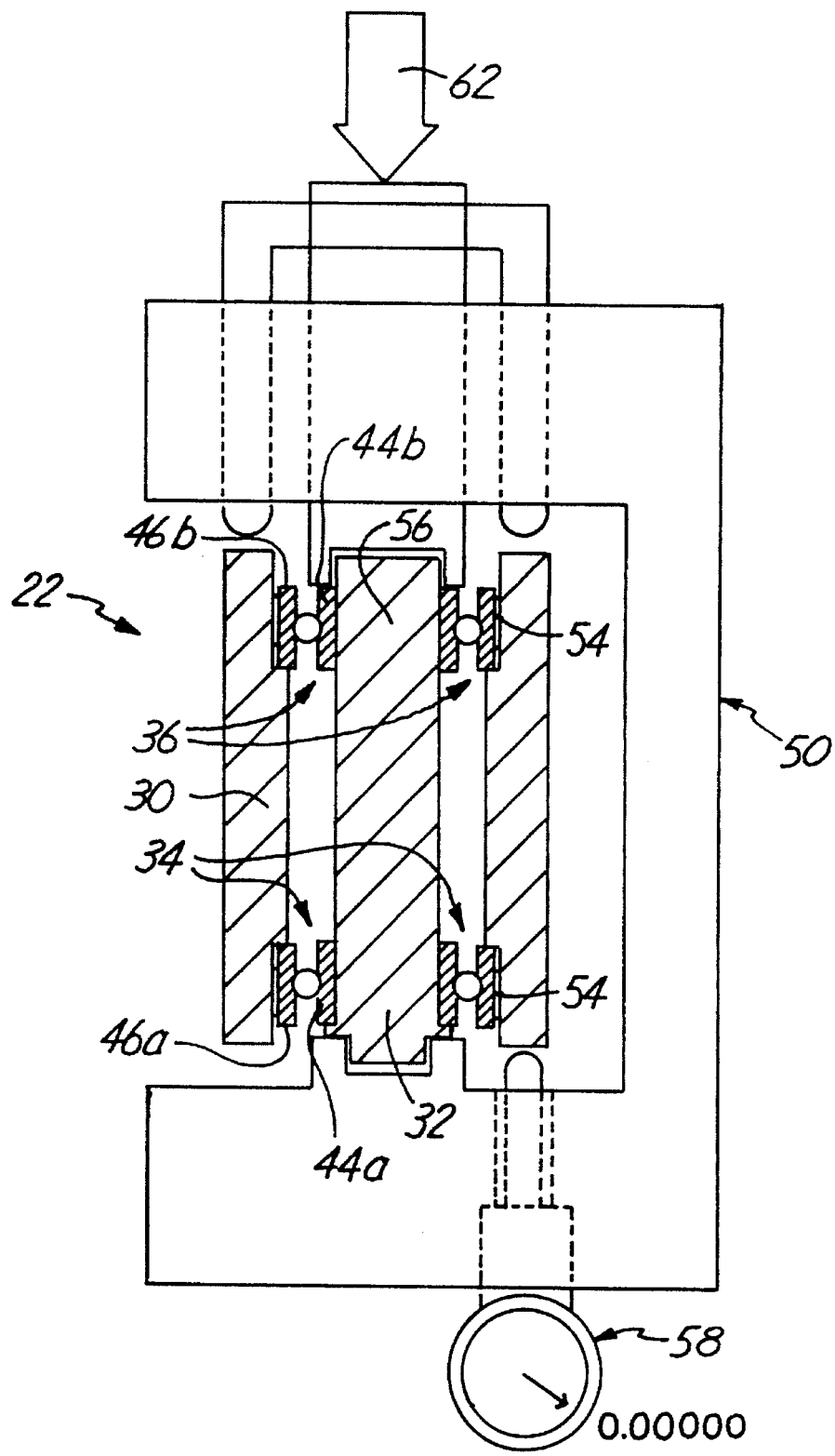
FIG. 8 is a cross-sectional view of the pivot assembly, taken along line A—A of FIG. 2, shown in a schematic fixture after final axial positioning of the fourth race.

The assembly load 60 is now removed from the housing 30, and the housing 30 accordingly moves up relative to the shaft 32 due to the decompression of the lower bearing 34. As shown in FIG. 8, the upper inner race 44b is now pressed to its final axial position, as by lead screw press 62 (shown schematically). After about 0.002 inches of movement, and the free axial play will be taken up. At this point, for every 0.0001 in. movement of the upper inner race 44b, the housing 30 will move downward half that amount, since both bearings are undergoing an equal and opposite compressive load. While observing the indicator 58, the upper inner race 44b is pressed down the smooth diameter section 56 of the shaft 32 until the indicator 58 again zeroes out. With the preload thus applied, the upper bearing 36 will be configured as shown in FIG. 5, and the lower bearing 34 will be configured as shown in FIG. 6. The preload carried by both bearings 34, 36 in this condition is equal to the assembly load previously applied.

The fixture 50 for performing these operation should be a very stiff bearing press such that all the axial dislocation caused by the assembly/preload is within the bearings 34, 36 and the pivot assembly 22 itself and not the fixture. One should be able to press the upper inner race 44b to within 0.0001–0.0002 inches of its desired position. The fixture 50 must prevent rotation of housing 30, hold the shaft 32 securely, be stiff enough so as to have very little deflection, and prevent binding or large applied moments under the loads needed to press a bearing 36. A ⅜ inch, 56 thread per inch lead screw press has been found suitable to hand press the upper inner race 44b to 0.0001 inch increments of axial position. The fixturing device 50 should retain very little stored strain during press operation, and provide a large amount of mechanical advantage. This will help to prevent stick-slip as the fourth race 44b is pressed into position.

Workers skilled in the art will appreciate that this invention describes a method of providing a proper, closely monitored amount of preload on the bearing assembly. The problems associated with a loose-fitting fourth race are avoided, as are all the problems associated with adhesives.

Although the present invention has been described with reference to preferred embodiments, workers skilled in the art will recognize that changes may be made in form and detail without departing from the spirit and scope of the invention.

What is claimed is:

1. A method for preloading bearings used in a pivot assembly for use in a disc drive actuator arm, the pivot assembly pivoting about an axis and having a housing, a shaft, and axially-arranged first and second bearings between the housing and the shaft, the method comprising;

applying an assembly load to the housing relative to the shaft in the axial direction, such that the assembly load is carried entirely by the first bearing;

observing as a reference location the axial location of the housing relative to the shaft with the assembly load applied;

removing the assembly load; and moving a race of the second bearing until the housing is at the reference location.

2. The method for preloading bearings of claim 1 and further comprising the step of:

determining a desired preload necessary to substantially eliminate radial play of the first and second bearing.

3. The method for preloading bearings of claim 2, wherein the assembly load is substantially equivalent to the desired preload.

4. The method for preloading bearings of claim 3 wherein the assembly load is from 3 to 5 pounds.

5. The method for preloading bearings of claim 1 wherein the reference location is measured in increments of less than 0.001 inches.

6. A method for determining the final axial position of a fourth race of a bearing of a pivot assembly for use in a disc drive actuator arm, the pivot assembly having a shaft with an axis and a housing, the shaft and housing being connected by axially-arranged first and second bearings, the first bearing having a first and second race, the second bearing having a third and fourth race, the method comprising:

attaching the first, second and third races between the shaft and the housing;

placing the fourth race between the shaft and the housing at a pre-position such that the second bearing remains within axial play when axial play of the first bearing is taken up;

applying an assembly load to the housing relative to the shaft in the axial direction, such that the assembly load is carried entirely by the first bearing and the second bearing remains unloaded;

observing as a reference location the axial location of the housing relative to the shaft with the assembly load applied; and determining the axial position of the fourth race which will place the housing in the reference location after the assembly load is removed.

7. The method for determining the final axial position of a fourth race of claim 6 wherein the step of placing the fourth race further comprises:

press-fitting the fourth race to the housing.

8. The method for determining the final axial position of a fourth race of claim 6 wherein the step of placing the fourth race further comprises:

press-fitting the fourth race to the shaft.

9. The method for determining the final axial position of a fourth race of claim 8 wherein the step of attaching the first, second and third races further comprises:

abutting the first race of the first bearing against a shoulder of the shaft;

abutting the second race of the first bearing against a shoulder of the housing; and abutting the third race of the second bearing against a shoulder of the housing.

10. The method for determining the final axial position of a fourth race of claim 6 wherein the step of attaching the first, second and third races further comprises:

press-fitting the first race of the first bearing to the shaft;

press-fitting the second race of the first bearing to the housing; and press-fitting the third race of the second bearing to the housing.

11. The method for determining the final axial position of a fourth race of claim 6, wherein the second and third races are attached with a first axial distance between them, wherein the first race and the fourth race have a second axial distance between them; and the step of placing the fourth race further comprises:

placing the fourth race such that the second axial distance is 0.001–0.005 inches less than the first axial distance.

12. A method for assembling a preloaded bearing of a pivot assembly for use in a disc drive actuator arm, the method comprising:

attaching an inner race of a first bearing to a shaft having an axis, the first bearing having axial play in an unloaded state;

attaching a housing to an outer race of the first bearing;

attaching an outer race of a second bearing to the housing, the second bearing having axial play in an unloaded state;

press-fitting an inner race of the second bearing to the shaft along a uniform diameter section of the shaft, at a position such that the second bearing remains in axial play when axial play of the first bearing is taken up;

applying an assembly load to the housing relative to the shaft in the axial direction, such that the assembly load is carried entirely by the first bearing and the second bearing remains unloaded;

observing as a reference location the axial location of the housing relative to the shaft with the assembly load applied;

removing the assembly load; and moving the inner race of the second bearing along the uniform diameter section of the shaft until the housing is at the reference location.

13. The method for assembling a pivot assembly of claim 12 and further comprising the step of:

securing the shaft in a fixture for attachment of the first and second bearings to the shaft.

14. The method for assembling a pivot assembly of claim 12 wherein the step of moving the inner race of the second bearing further comprises rotating a lead screw to position the inner race of the second bearing.

15. The method for assembling a pivot assembly of claim 12 wherein a nominal diameter of the inner race of the second bearing is 0.002–0.004 inches less than a nominal diameter of the uniform diameter section of the shaft.

* * * * *